W. R. ALLEN.
SCALE.
APPLICATION FILED MAY 20, 1910.

999,730.

Patented Aug. 8, 1911.

Witnesses
Walter Troemel.
Thomas W. McMeans

Inventor
William Randolph Allen,
By Bradford & Hood,
Attorneys

UNITED STATES PATENT OFFICE.

WILLIAM RANDOLPH ALLEN, OF INDIANAPOLIS, INDIANA.

SCALE.

999,730.

Specification of Letters Patent.  Patented Aug. 8, 1911.

Application filed May 20, 1910. Serial No. 562,414.

*To all whom it may concern:*

Be it known that I, WILLIAM RANDOLPH ALLEN, a citizen of the United States, residing at Indianapolis, in the county of Marion and State of Indiana, have invented a new and useful Scale, of which the following is a specification.

The ordinary machinist's measuring scale is equipped with four sets of graduations reading in 8ths, 16ths, 32nds and 64ths and the average machinist finds that the divisions of the 64th scale are so small as to be confusing and, therefore, in measuring for 64ths, is apt in most cases to use the 32nd scale and approximate the final division. Such a practice, of course, leads to inaccuracies but is apt to consume less time than a careful reading of the 64th scale. Where a person's eyes are not especially good, a similar difficulty is found in connection with the 32nd scale and approximations are apt to be made on the 16th scale.

The object of my present invention is to produce a scale by means of which accurate measurements to the 64th (or other fine division) may be accomplished by means of a scale, the divisions of which are considerably farther apart than the measuring capacity of the scale.

The accompanying drawings illustrate my invention as applied to a scale with 64th divisions, although it is to be understood that my invention is not by any means limited to that particular use.

Figure 1:
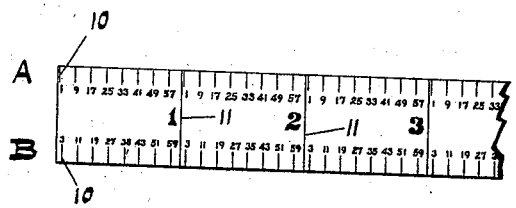
Figure 2:
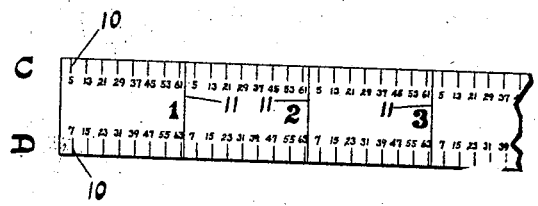

Figure 1 is a fragmentary side elevation of two companion series of the scale, and Fig. 2 a similar view of the two other companion series.

In the drawings, A indicates a series of graduations equally spaced from each other 1/8 of an inch but having the initial graduation 10 spaced from the zero 0, 1/64 of an inch; B indicates a similar set of graduations having its initial mark 10 spaced from the zero 0, 3/64 of an inch; C indicates a series of graduations having its initial mark 10 spaced 5/64 of an inch from the zero 0, and D indicates a set of graduations having its initial mark 10 spaced 7/64 of an inch from the zero 0.

If desired for convenience in reading, there may be provided a series of graduations 11 uniformly spaced from the zero 0 as, for instance, at inch distances. In the form of scale shown, the divisions of each series are spaced from each other 1/8 of an inch and the initial markings of the various scales are therefore spaced from the zero 0 on the odd 64ths. If the graduations of the scale were to be placed 1/16 of an inch apart (which is a readily readable division) it would then only be necessary to provide two companion scales having their initial markings spaced 1/64 and 3/64 from the zero. If the scale is intended to be used only for measuring to the 32nd of an inch and the markings of each scale are spaced 1/8 apart, two companion scales would be provided, the initial markings being 1/32 and 3/32 from the zero.

In the drawings, the zero is established by the end of the scale but it will be readily understood that an established marking on the face of the scale could be fully as effective although not quite so convenient.

For measuring the even 64ths, an ordinary measuring scale divided into 32nds would be used.

In order to measure any distance equal to a number of 8ths plus 1/64, scale A would be used; to measure a distance equal to a number of 8ths plus 3/64, scale B would be used, and scales C and B would be used to measure, respectively, distances equal to a number of 8ths plus 5/64 or 7/64.

I wish it to be thoroughly understood that while my improved scale is especially adapted for use in connection with fine divisions like 64ths, or finer, the invention is by no means limited to that particular use.

I claim as my invention:

1. A measuring scale comprising two or more independent companion sets of evenly spaced graduations, the initial markings of each set of the graduations being differently offset from an established zero by an odd number of subdivisions of one of the said uniform spacings.

2. A measuring scale comprising two or more independent companion sets of evenly spaced graduations, the initial markings of each set of the graduations being differently offset from an established zero by a subdivision of one of the said uniform spacings.

3. A measuring scale comprising a plurality of independent sets of uniformly spaced graduations, the initial markings of the several sets of graduations being offset from an established zero by the odd numbers of subdivisions of one of the uniform spacings, there being as many of the sets of graduations as there are odd subdivisions in one of the uniform spacings.

In witness whereof, I have hereunto set my hand and seal at Indianapolis, Indiana, this eighteenth day of May, A. D. one thousand nine hundred and ten.

WILLIAM RANDOLPH ALLEN. [L. S.]

Witnesses:
CHESTER BRADFORD,
THOMAS W. MCMEANS.

Copies of this patent may be obtained for five cents each, by addressing the "Commissioner of Patents, Washington, D. C."